(No Model.)
W. L. LAFFER.
FORK.
No. 517,461. Patented Apr. 3, 1894.
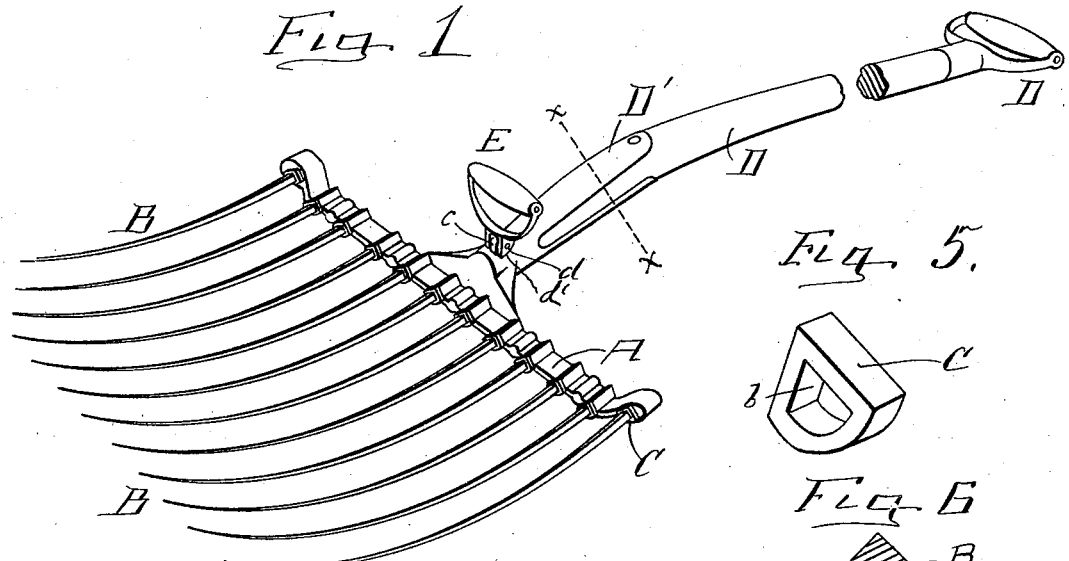
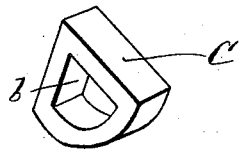
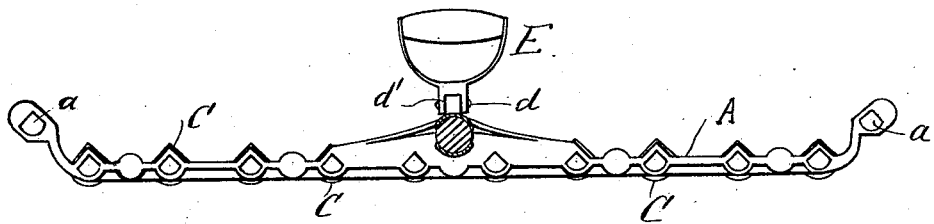
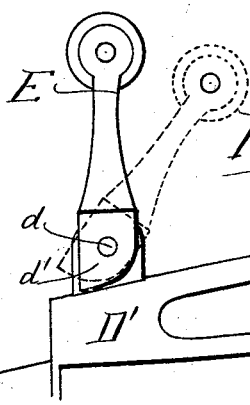
Witnesses
Inventor,
William L. Laffer
By Fred W. Bond
Attorney.

UNITED STATES PATENT OFFICE.

WILLIAM L. LAFFER, OF CLEVELAND, OHIO.

FORK.

SPECIFICATION forming part of Letters Patent No. 517,461, dated April 3, 1894.

Application filed August 19, 1893. Serial No. 483,567. (No model.)

*To all whom it may concern:*

Be it known that I, WILLIAM L. LAFFER, a citizen of the United States, residing at Cleveland, in the county of Cuyahoga and State of Ohio, have invented certain new and useful Improvements in Forks; and I do hereby declare that the following is a full, clear, and exact description of the same, reference being had to the annexed drawings, making a part of this specification, and to the letters of reference marked thereon, in which—

Figure 1 is a perspective view of the fork. Fig. 2 is a view of the fork head showing the lifting handle properly attached. Fig. 3 is a side view of the handle socket showing the lifting handle attached thereto. Fig. 4 is a transverse section of the head showing a tine properly located. Fig. 5 is a detached view of one of the tine retaining bands. Fig. 6 is a transverse section of one of the tines.

Similar letters of reference indicate corresponding parts in all the figures of the drawings.

In the accompanying drawings A represents the fork head which is substantially of the form shown in the drawings, and may be of any desired length, reference being had to the width of the fork designed to be constructed. The fork head A is provided with the tine apertures $a$, which apertures are for the purpose of receiving the rear ends of the tines B, which tines are located and arranged as illustrated in Fig. 1. The tines B are substantially of the form shown in Fig. 6, in cross section, which is that of a sector of a circle, the segmental portion thereof being upon the bottom or under side of the tine, when the same is placed in proper position to construct the fork. The object and purpose of forming the tines as above described, are to provide a tine that will be light, and at the same time possess the desired amount of strength. The tines B taper from their rear ends to their front or forward ends which forward ends terminate in points. The apertures $a$ formed in the head A are tapered as illustrated in Fig. 4; the taper of said apertures corresponding with the taper of the tines B.

For the purpose of securely holding the tines B to the head A, the retaining bands C are provided, which bands are substantially of the form shown in Fig. 5. In use the retaining bands C are expanded by heat and while in a heated condition they are placed upon the tines B as illustrated in Fig. 1, in which position said bands are allowed to cool, and contract, thereby securely seating said bands upon the tines B. It will be understood that the apertures $b$ formed in the bands C should be somewhat smaller than the tines B in cross section at the points where said bands are to be located.

The handle D may be substantially of the form shown and as shown it is attached to the socket D' in the ordinary manner.

For the purpose of providing a means for assisting in lifting the fork when loaded, the lifting handle E is provided, and as shown it is pivotally attached to the rib $c$ by means of the rivet $d$ or its equivalent. For the purpose of limiting the movements of the handle E the flanges $d'$ are provided, which flanges are so formed that they will strike the top or upper side of the socket D'. The object and purpose of limiting the movements of the handle E is to prevent any injury to the hand of the person using the fork.

It will be understood that by providing the tines B with the rounded bottoms that the fork tines can be more easily operated or entered below the coal or other material to be received upon the tines. By providing the tapered apertures $a$ and tapering the tines B, said tines will be securely held against longitudinal movement by means of the retaining bands C thereby preventing the displacement of the tines after they have been properly attached to the head A.

In the drawings I have illustrated the retaining bands C of the form of a sector, but it will be understood that any other form will answer the same purpose so far as the band itself is concerned, but it will be understood that the aperture $b$ should conform to the form of the tine B in cross section.

Having fully described my invention, what I claim as new, and desire to secure by Letters Patent, is—

1. The combination of the head A, provided with tine apertures, the tapered tines B, and the retaining bands C, located in front of the head, and shrunk upon the tines, substantially as and for the purpose set forth.

2. The combination of the head A provided with tapered tine apertures $a$, the tapered tines B sector shape in cross section and the retaining bands C shrunk around the tines, substantially as and for the purpose specified.

In testimony that I claim the above I have hereunto subscribed my name in the presence of two witnesses.

WILLIAM L. LAFFER.

Witnesses:
PETER J. COLLINS,
F. W. BOND.